United States Patent [19]

Muller

[11] Patent Number: 4,784,366

[45] Date of Patent: Nov. 15, 1988

[54] POUR HOLE LOCK SYSTEM

[75] Inventor: John Muller, Englewood, Tenn.

[73] Assignee: Davidson Textron Inc., Dover, N.H.

[21] Appl. No.: 84,917

[22] Filed: Aug. 13, 1987

[51] Int. Cl.[4] .............................................. B29C 33/12
[52] U.S. Cl. ...................................... 249/91; 249/108;
425/116; 425/117; 425/817 R
[58] Field of Search .......... 249/105, 107, 108, 219 R,
249/117, 83, 85, 91; 425/4 R, 817 R, 116, 117

[56] References Cited

U.S. PATENT DOCUMENTS

| | | | |
|---|---|---|---|
| 1,149,842 | 8/1915 | Le May et al. ...................... | 249/107 |
| 1,703,457 | 2/1929 | Robertson ............................ | 141/65 |
| 2,380,751 | 7/1945 | Gowland .............................. | 249/108 |
| 2,832,378 | 4/1958 | Beavon ................................ | 141/287 |
| 3,354,508 | 11/1967 | Draben ............................... | 425/449 |
| 3,534,788 | 10/1970 | Vergobbi ............................. | 141/392 |
| 3,805,857 | 4/1974 | Johnson et al. .................. | 152/213 R |
| 3,913,892 | 10/1975 | Ersfield ............................... | 425/4 R |
| 4,030,267 | 6/1977 | Arnaud ............................... | 264/46.6 |
| 4,033,710 | 7/1977 | Hanning ............................. | 425/4 R |
| 4,303,720 | 12/1981 | Clough .............................. | 428/211 |
| 4,420,447 | 12/1983 | Nakashima ........................ | 264/46.6 |
| 4,426,348 | 1/1984 | Salisbury .......................... | 264/328.6 |
| 4,469,152 | 9/1984 | Hardee et al. .................... | 285/97 |
| 4,477,504 | 10/1984 | Bailey et al. ..................... | 428/138 |

Primary Examiner—Willard Hoag
Attorney, Agent, or Firm—John C. Evans

[57] ABSTRACT

An improved mold assembly which has a cavity mold part and a cover which form a space into which foam precursors are poured and the cover carries a mold insert which is bonded to the foam formed in the mold space; the cover carries a pour spout and a seal for preventing foam leakage from the space wherein the improvement comprises: means including a pour hole and a rotatable tube extending through said pour hole for defining a pour spout having an inboard end located within the space when the mold assembly is closed; seal means in surrounding sealing relationship with said inboard end of said rotatable tube; and means operative when the cover is closed and when the tube is located in the pour space for holding the insert within a desired variation of a designed location in said space and for holding the insert against said seal means to prevent foam leakage through the pour hole.

9 Claims, 2 Drawing Sheets

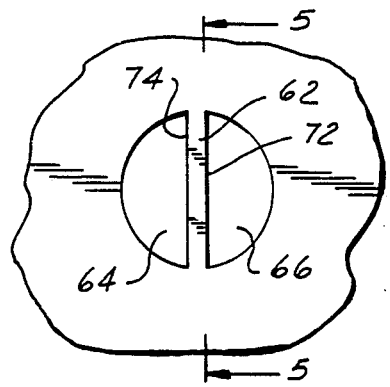 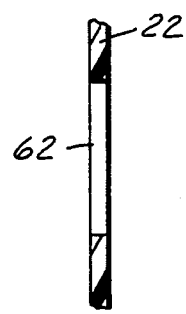
FIG.4  FIG.5
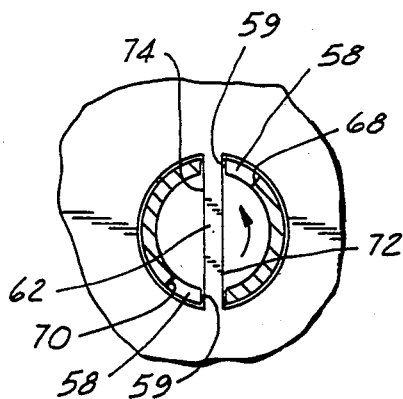 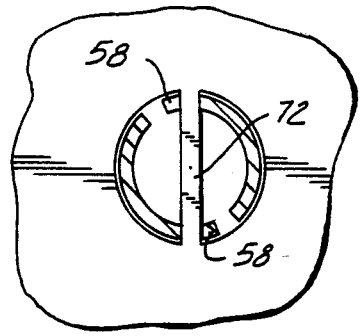
FIG.6  FIG.7
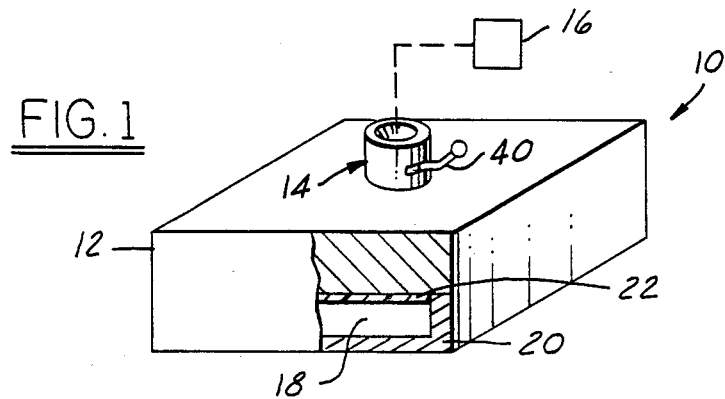
FIG.1

POUR HOLE LOCK SYSTEM

FIELD OF THE INVENTION

This invention relates to mold apparatus and more particularly to mold apparatus into which polymeric foam precursors are poured for reaction and bonding to a structural insert supported within the mold cavity.

BACKGROUND OF THE INVENTION

The manufacture of composite plastic assemblies such as instrument panels, vehicle interior parts and the like as well as other assemblies having a plastic foam layer is accomplished by use of mold apparatus in which foam precursors are poured through an opening in one of the component parts of the mold apparatus. One problem is to provide a seal at the opening to prevent the escape of the foam from the mold during the foaming process.

Another problem arises in such manufacture when it is necessary to precisely locate an insert component in a mold cavity so that the foam material will be formed with respect to the insert to form a replicate of a design configuration in which the insert is at an exact dimensional relationship with respect to the foamed portions of the finished product.

PRIOR ART STATEMENT

Various systems have been proposed to seal a fill opening into a container. One example of such a system is shown in U.S. Pat. No. 4,469,152 in which a hatch closure includes an inflatable seal ring. The system does not present the problem of foam leakage nor does it disclose a fill system for directing foam precursors into a cavity of mold tooling apparatus.

Other examples of fill systems having seal rings that prevent the escape of a fluid are shown in U.S. Pat. Nos. 2,832,378 and 3,805,857. They relate specifically to gasoline fill systems and do not suggest a structure or arrangement of parts for use in mold apparatus for forming composite plastic parts.

U.S. Pat. Nos. 1,703,457; 2,955,796; 3,534,788 disclose filling machines in which a pour spout or fill/evacuation pipe is sealed with respect to a container. Again, none of the references relate to a mold apparatus for use in the manufacture of composite plastic parts in which foam precursors are directed into a mold cavity for reaction therein to form a plastic part.

U.S. Pat. No. 3,354,508 discloses a charge fitting for a plastic molding apparatus which includes an elastomeric valve disk that engages a nozzle for injecting material into a cavity between first and second mold parts. In the arrangement, the nozzle is sealed as it is directing plastic into the mold apparatus. The fitting will seal the charge within the mold when the nozzle is removed therefrom. While suitable for its intended purpose, the molding apparatus does not include a preformed shell or insert which cooperates with the pour head to seal the mold. Furthermore, there is no provision or means to both seal a pour hole and precisely locate an insert within the mold cavity.

U.S. Pat. No. 4,030,267 discloses a old packaging system wherein a lid carries an inlet duct with a ring of elastic material. When the lid is closed, a plug is selectively connected on the inlet duct to engage the ring to prevent the escape of foam from the mold cavity. The fill system does not pass through a wall of a cavity mold that is arranged to support an insert at a precise location within the mold cavity to replicate the design location of the insert with respect to foamed portions of the finished part.

U.S. Pat. No. 4,033,710 discloses a fill nozzle arrangement for directing thermoplastic material into a pour mold cavity. The fill nozzle includes a pair of shutter jaws that are made of resilient material. The jaws close around an insert tube for injecting a foaming agent into the foam material during the molding process. The jaws do not seal against a preformed insert in the assembly which is arranged in precisely spaced relationship with the mold cavity to locate the insert in a desired relationship with the foamed portions of the finished part.

U.S. Pat. Nos. 4,303,720; 4,420,447 and 4,477,504 disclose processes for forming instrument panel composite structures in which an insert is supported on a mold cover having a cavity part supporting a skin. In such processes the foam precursors are poured into the mold cavity when the lid is open. The mold is closed and the foam precursors expand to fill the foam cavity and define a foam layer on the back side of the insert. In such arrangements there is no structure for both supporting the insert at a precise location in the mold cavity while sealing a pour opening which in part is directed through the insert.

SUMMARY OF THE INVENTION

One feature of the present invention is the provision of a mold apparatus which includes a permanent pour nozzle on the mold cover which defines a part of a pour opening into a mold cavity. An insert is supported in the cavity and has material foamed thereon to form the finished part. The permanent pour nozzle includes means for both precisely positioning and sealing the insert with respect to the mold cavity.

An advantage of the present invention is that the permanent pour nozzle can have its dimensions easily changed for customizing a mold assembly for a wide variety of parts. A further advantage of the present invention is that the pour nozzle includes means for both positioning and sealing an insert such that more accurate composite parts can be made by a process which reduces waste foam; reduces trimming and picking foam from exterior surfaces of the finished part; and reduces shot weight of the foam precursors required to form the foamed portions of the finished part.

A further advantage is that the pour hole lock system of the present invention can be incorporated into existing foam lines without requiring special modifications thereto.

In one working embodiment the pour hole lock system is associated with a mold assembly having a cavity mold part and a cover forming a space for receiving foam precursors and an insert. The cover carries a pour spout and a seal for preventing foam leakage from the space all of which are improved by: means including a rotatable tube extending through a pour hole for defining a pour spout having an inboard end located within the space when the mold assembly is closed; seal means in surrounding relationship with the inboard end of the rotatable tube; and means operative when such tube is positioned in the pour space for holding the insert against the seal means to seal against foam leakage through the pour hole and for locating the insert within a desired variation of a designed location in such space.

The pour hole is located in the cover. A funneled pour spout pedestal is supported on the cover in alignment with the pour hole. A rotatable tube has one end rotatably supported on the pedestal. Means are provided for positioning the extension tube in lock and release positions. Means are also provided for sealing such one end with respect to the funneled pour spout pedestal. In one arrangement gripping and lock means are provided on the tube and the insert supported in the space for picking up and locating the insert in the space so as to reduce variations of the insert location with respect to the desired design position.

Additional features and advantages of the present invention will become apparent from the following detailed description of a preferred embodiment of the invention when considered in conjunction with the accompanying drawings wherein:

BRIEF DESCRIPTION OF THE DRAWINGS

FIG. 1 is a diagrammatic view of a mold tooling apparatus improved by the pour hole lock system of the present invention;

FIG. 4 is a fragmentary top elevational view of a insert of the present invention;

FIG. 5 is a sectional view taken along the line 5—5 of FIG. 4 looking in the direction of the arrows;

FIG. 6 is a sectional view taken along the line 6—6 of FIG. 5 looking in the direction of the arrows; and FIG. 7 is a view like FIG. 6 showing the lock in an engaged position.

DETAILED DESCRIPTION OF THE PREFERRED EMBODIMENT

Figure 2:
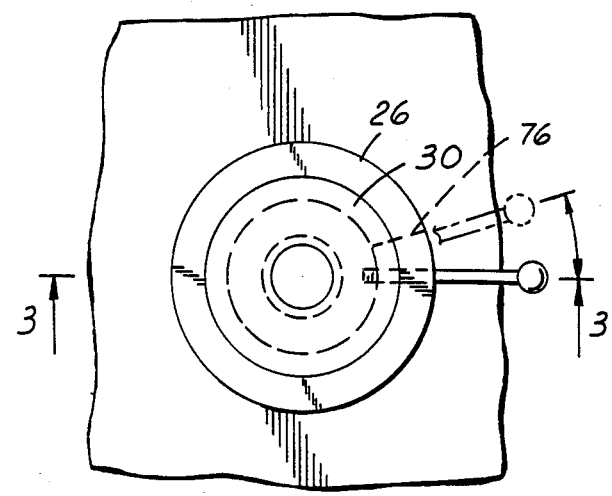
FIG. 2 is a top elevational view of a pour hole lock system in accordance with the present invention.

Referring now to FIG. 1 a closed foam mold 10 is illustrated. It includes a removable cover 12 on which is supported a funneled pour spout 14 constructed in accordance with the present invention.

The funneled pour spout 14 receives suitable foam precursors from a supply 16. The formulation of the foam precursors will depend on the desired properties of the finished product. For purposes of the present invention it is only necessary to recognize that the formulation is one of many that may be selected by one skilled in the art to provide a desired stiffness, resilience, density or other physical property. Typically such formulations are a two part system to produce a foamable polyurethane composition. An example of one suitable low density (3 to 5 pound per cubic foot) polyurethane foam is a mixture of foam precursors including about 60 percent of a suitable polyol and a 30 percent isocyanate (preferably all MDI or a MDI/TDI blend) and with the remainder of the composition being auxiliary chemicals such as fluorocarbons, water, catalysts, surfactants and fillers. Further examples of suitable compositions can be found in U.S. Pat. Nos. 4,426,348 and 3,111,365.

The pour spout 14 directs the foam precursors into a space 18 formed between the cover 12 and a female cavity mold part 20 which is selectively heated and cooled to aid the reaction if required and to cool the part for stripping the finished part.

An insert 22 is carried by the cover 12 to be located in the space 18 such that the foam material will be bonded thereto during the manufacturing process.

One problem that arises in such closed mold systems is that of providing a seal around the pour hole into the space 18 so that foam material will not escape from the closed mold. Foam leakage constitutes waste but also must be trimmed from a finished part and requires a foam shot weight that exceeds the actual part design.

Another problem that arises in such closed mold systems is that of accurately locating the insert 22 in the mold space 18 so that the insert will be located with respect to the walls 24 of the cavity mold part 20 and within an acceptable variation range from the actual part design location.

The pour spout 14 solves both the aforesaid problems by including a combined locating and sealing functions. More particularly, the pour spout 14 includes a pedestal 26 fixedly secured to the outer surface 28 of the cover 12. The pedestal 26 has a funneled inlet 30 and a pour passage 32 that communicates with a pour passage 33 formed through a rotatable tube 34 that defines a pour spout extension that extends through the cover 12 into communication with the space 18. The rotatable tube 34 has an upper large diameter end 36 received in a large diameter bore 38 of pedestal 26. The large diameter end 36 is sealed with respect to the pedestal 26 by an O-ring 39. The large diameter end 36 is also connected to an operator arm 40 extending through a slot 42 in the pedestal 26 and operative to position the rotatable tube 34 in a lock and in a release position to be described.

While the operator is shown as a hand operated device it can be readily modified to be coupled to an air cylinder for pneumatic operation and such operation is readily made in existing foam line systems without modification to either the physical layout or control systems associated therewith.

One aspect of the present invention is that the rotatable tube 34 and the insert 22 are configured to provide coacting gripping and locking means 44 that will position the insert 22 within the space 18 so that it will be located within an acceptable variation from a desired true design location. Further, the gripping means 44 will locate the insert 22 in sealing relationship with a gasket 46 to seal the pour hole.

More specifically, the gasket 46 is an annular flat member of suitable resilient material which is supportingly received in a recess 48 formed on the inboard surface 50 of the cover 12. When the insert 22 is properly in place its outboard surface 52 engages the gasket 46 to seal a pour opening 54. The rotatable tube 34 has a bayonet type connector 56 formed on the distal end thereof. The connector 56 includes two diametrically located slots 58 which define bayonet ends 59 with a cam surface 60. When the tube 12 is a released position the ends 59 are located on either side of a lock catch 62 formed in the insert 22 as best seen in FIGS. 4 and 6. The lock catch 62 is a thin rib which has two semicircular openings 64, 66 on either side. The openings 64,66 receive the foam precursors from the pour opening 54 for passage into the space 18.

Figure 3:
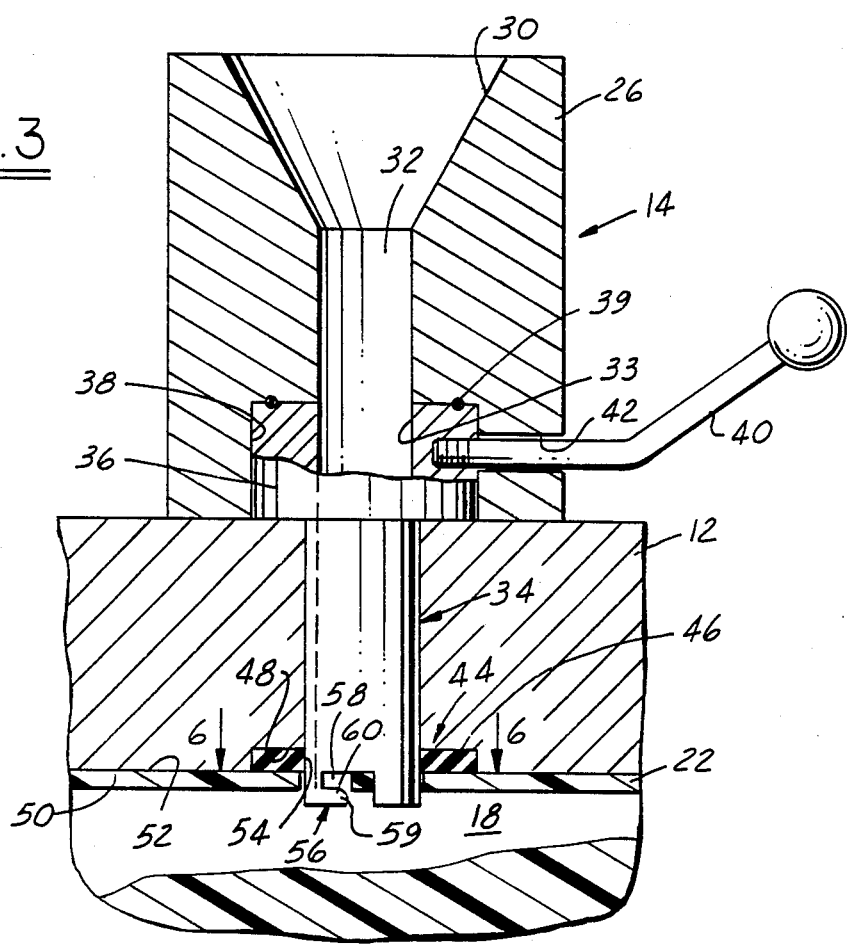
FIG. 3 is sectional view of the pour hole lock system of the present invention taken on the line 3—3 of FIG. 2 looking in the direction of the arrows.

When the connector 56 grips the insert 22 the bayonet ends 59 are rotated into a locked position in an underlying relationship with the lock catch 62 and the cam surfaces 60 will draw the insert into sealed engagement with the gasket 46 as best seen in FIGS. 3 and 7.

In addition to producing a sealing engagement between the insert 22 and the gasket 46,the connector 56 positions the insert 22 laterally within the space such that the foam material is formed on an insert which will be positioned within an acceptable range of variation from the true design position. Such positioning is produced by engagement between shoulders 68, 70 on the connector 56 and the side edges 72, 74 of the lock catch 62. Such engagement shifts the insert 22 slightly until the operator arm 40 is located with respect to a reference surface 76 on the pedestal 26. The connector 56 and lock catch 62 thus combine to shift the insert 22 slightly and true it with respect to the mold cavity. The foam material has physical properties when cured that will permit the connector 56 to be readily separated from the finished part when the rotatable tube 34 is rotated to the release position and the cover 12 is removed from the mold cavity part following the molding process. The cover and rotatable tube 34 are then separated from the insert 22 by pulling the bayonet ends 59 from the openings 64, 66.

Obviously, many modifications and variations of the present invention are possible in light of the above teachings. It is, therefore, to be understood that within the scope of the appended claims, the invention may be practiced otherwise than as specifically described.

What is claimed is:

1. In a mold tooling system having a female mold part and a mold cover for carrying an insert to be positioned within the cavity of the female mold part the improvement comprising:
   means for defining a lock catch on said insert;
   fill means for defining a pour nozzle for directing foam precursors through the mold cover into the cavity of the female mold part;
   and coacting surface means on said fill means and said lock catch for engaging said fill means to said insert for releasably securing and locating the insert on the cover to reduce the variation of the actual insert location within the cavity with reference to a preselected true location therein.

2. In the mold tooling system of claim 1;
   said fill means including a pour hole and a rotatable tube extending through said pour hole for defining a pour spout having an inboard end located within the cavity when the mold is closed;
   seal means in surrounding sealing relationship with said inboard end of said rotatable tube;
   and means operative when said tube is positioned in cavity for holding the insert within a desired variation of a designed location in said space and for holding the insert against said seal means to seal against foam leakage through said pour hole.

3. In the mold tooling system of claim 1;
   a pour hole, a funneled pour spout pedestal on the cover in alignment with a pour hole;
   an extension tube having one end rotatably supported on said pedestal;
   means for positioning said extension tube in lock and release positions;
   means for sealing said one end with respect to said funneled pour spout pedestal;
   and said coacting surfaces means including gripping and lock means on said extension tube and the insert for picking up and locating the insert in the cavity so as to reduce variations of the insert location with respect to the desired design position.

4. In a mold assembly having a cavity mold part and a cover forming a space for receiving foam precursors and an insert during a plastic foaming process and wherein the cover carries a pour spout and a seal for preventing foam leakage from the space the improvement comprising:
   means forming a pour hole and a rotatable tube extending through said pour hole for defining a pour spout having an inboard end located within the space when the mold assembly is closed;
   seal means in surrounding sealing relationship with said inboard end of said rotatable tube;
   and lock means operative when said tube is positioned in the pour space for holding the insert within a desired variation of a designed position in said space and against said seal means to seal against foam leakage around said pour hole.

5. In the mold assembly of claim 4, said pour hole being located in said cover;
   a funneled pour spout pedestal supported on said cover in alignment with said pour hole;
   an extension tube having one end rotatably supported on said pedestal;
   means for positioning said extension tube in lock and release positions;
   means for sealing said one end with respect to said funneled pour spout pedestal;
   and said lock means including gripping and locking means on said extension tube and the insert supported in the space for picking up and locating the insert in the space so as to reduce variations of the insert location with respect to the designed position.

6. In the mold assembly of claim 4, said rotatable tube having a bayonet connector on one end thereof;
   means forming a lock catch on the insert;
   said bayonet connector being rotatable into locked and released engagement with said lock catch, respectively, to locate the insert in the foam space prior to reacting foam precursors into the foam space and to release the rotatable tube from the insert and foam bonded thereto.

7. In the combination of claim 4, said cover having an inboard recess therein;
   said seal means including a gasket supported in said inboard recess to sealingly surround the pour hole;
   said gasket having an inboard surface engageable with said insert to seal against leakage of foam from the space in which the insert is located.

8. In the combination of claim 5, said cover having an inboard recess therein;
   said seal means including a gasket supported in said inboard recess to sealingly surround the pour hole;
   said gasket having an inboard surface engageable with the insert to seal against leakage of foam from the space in which the insert is located.

9. In the mold assembly of claim 8, said rotatable tube having a bayonet connector on one end thereof;
   means forming a lock catch on the insert to be located in the foam space;
   said bayonet connector being rotatable into locked and released engagement with said lock catch, respectively, to locate the insert in the foam space prior to reacting foam precursors into the foam space and to release the rotatable tube from the insert and foam bonded thereto.

* * * * *